Dec. 24, 1935.                G. W. WALTON                2,025,186
APPARATUS FOR USE WITH MODULATED ELECTRICAL OSCILLATIONS
                Filed Dec. 22, 1931           2 Sheets-Sheet 1
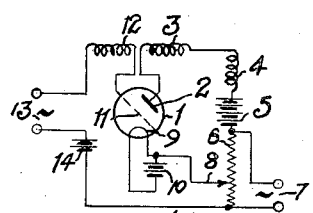
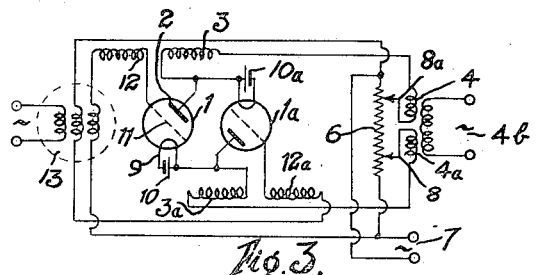
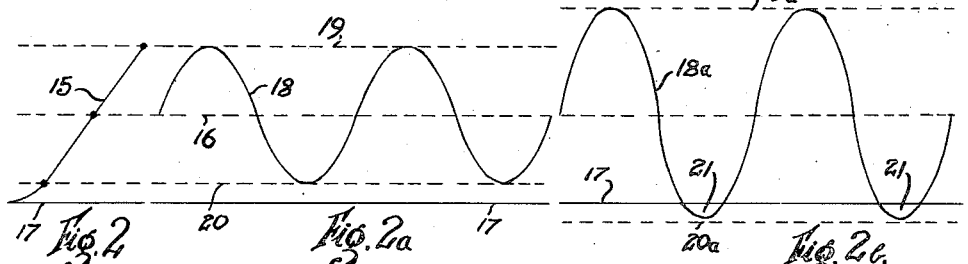
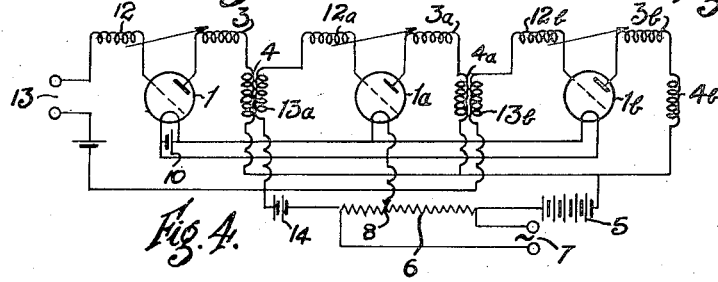
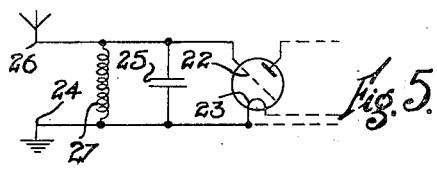
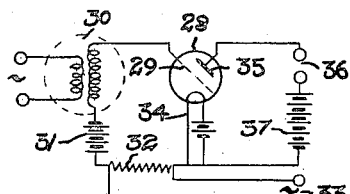
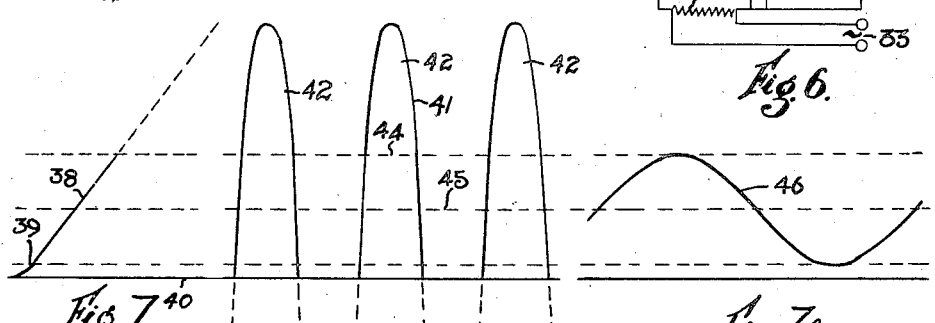

Dec. 24, 1935.  G. W. WALTON  2,025,186
APPARATUS FOR USE WITH MODULATED ELECTRICAL OSCILLATIONS
Filed Dec. 22, 1931  2 Sheets-Sheet 2
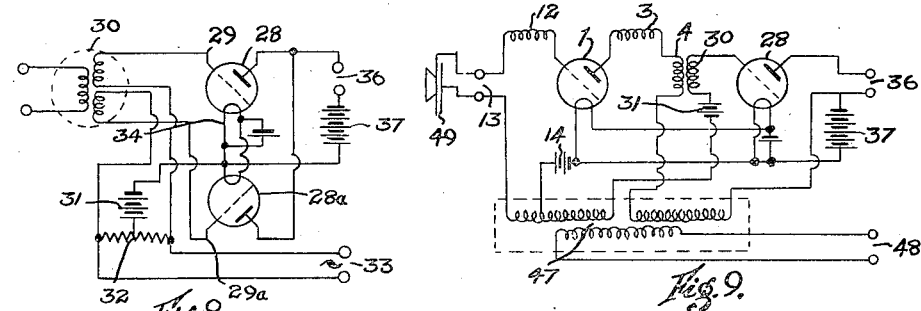
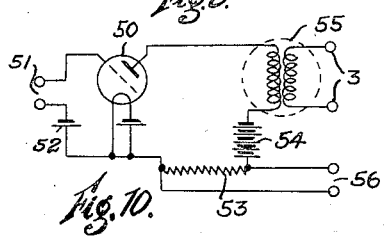
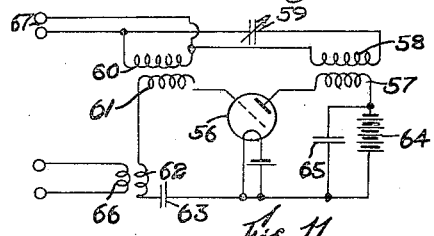
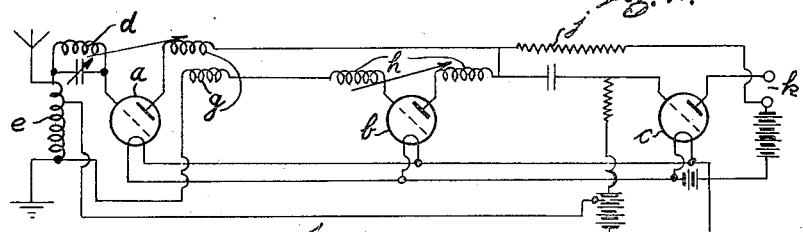
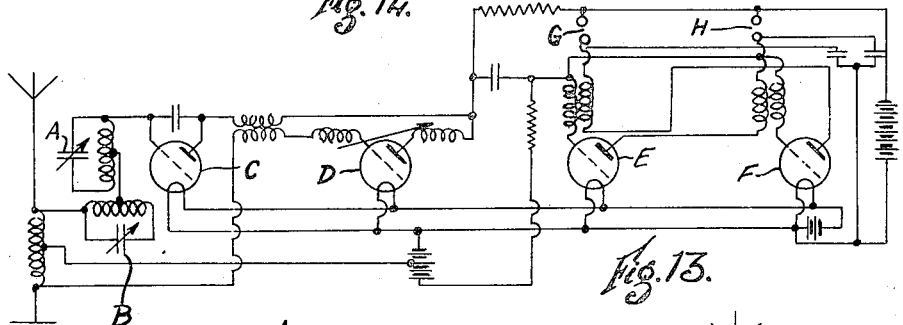
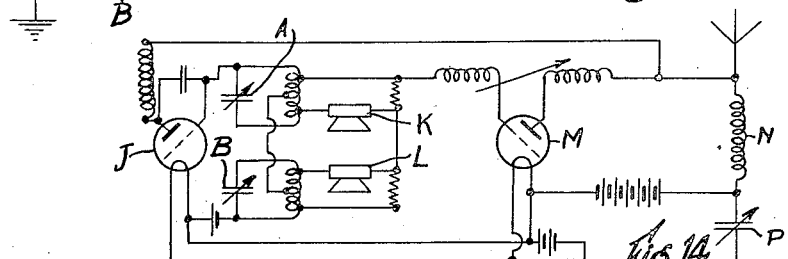

Patented Dec. 24, 1935

2,025,186

UNITED STATES PATENT OFFICE 2,025,186

APPARATUS FOR USE WITH MODULATED ELECTRICAL OSCILLATIONS

George William Walton, London, England

Application December 22, 1931, Serial No. 582,599
In Great Britain December 29, 1930

10 Claims. (Cl. 250—20)

This invention relates to receivers and other apparatus for use with modulated electrical oscillations and to thermionic amplifiers of electrical variations and has for its object the provision of apparatus which operates in such a manner as to minimize extraneous and unwanted variations whilst increasing the strength of the desired variations, and at the same time giving a ratio of amplification unobtainable by known methods, with a selectivity which is very considerably greater.

A further object is to provide receiving apparatus in which low frequency amplification is unnecessary, thereby reducing the distortion due to the low frequency part of such apparatus.

In such apparatus as at present known, the principle of operation is generally that a weak variation in one circuit is by resonance allowed to attain a maximum value, losses in the circuit being reduced to a minimum, and sometimes a negative resistance effect is also applied for this purpose by means of reaction. The variations of such a circuit are then used to control a greater amount of local power in a second circuit, e. g. by means of a thermionic valve. These arrangements are often repeated in several stages to obtain the requisite strength of variation needed to operate auxiliary apparatus, loudspeakers and the like.

According to a feature of the present invention on the other hand an entirely new principle is made use of in that there is provided an electric circuit having such damping that free oscillation thereof at a predetermined frequency is prevented, and means adapted to impress upon said circuit two oscillatory electromotive forces of the said frequency displaced in phase by substantially 180° relative to one another.

Other features of the invention will appear from the following description and the appended claims.

The advantages of the methods of this invention are many, low loss circuits are not necessary, in fact high loss circuits are preferable everywhere except in the local oscillator which generates the impressed oscillations, selectivity is increased, interfering signals and extraneous variations are reduced to a minimum, for only variations at the same frequency as the local loading frequency are amplified, all others being reduced by losses in the circuits. A good analogy is an elastic band, for if this is held loosely between two points, vibrations pass with difficulty between the two points, and if it is stretched tightly to tune to the applied vibrations they pass very readily.

This behavior is analogous to that of the tuned circuits used in known methods. If, however, the loose band is already forcedly vibrating at the frequency of the vibrations to be applied, its condition is analogous to that existing in the circuits according to the present invention, and the transmission between the two points is almost perfect. The reason obviously is that the forced vibration supplies practically all the losses, and not the vibration which is transmitted. Some further idea of this principle may be obtained from submarine cables, which would be almost impossible to operate if impulses were transmitted direct through them instead of the normal method of varying the charge of the cable. Of course the "charge" in this invention is a forced oscillation, but the actual operation is in many respects equivalent.

Referring to the accompanying drawings, which illustrate the invention diagrammatically and by way of example:

Fig. 1 shows the arrangement of an amplifier according to the invention;

Figs. 2, 2a and 2b are curves illustrating the operation and adjustment of the arrangement according to Fig. 1;

Fig. 3 is an arrangement of an amplifier according to the invention not using direct space discharge current;

Fig. 4 is an arrangement of a three-stage amplifier according to the invention;

Fig. 5 is a diagrammatic illustration of an arrangement of part of a known wireless receiver, which is shown for the purpose of comparison;

Fig. 6 illustrates a detector arrangement according to the invention;

Figs. 7, 7a and 7b are curves illustrating the operation of the arrangement shown in Fig. 6;

Fig. 8 shows another detector arrangement according to the invention;

Fig. 9 illustrates an arrangement of an amplifier for normal purposes according to the invention;

Fig. 10 shows a modulation arrangement for use with the amplifier illustrated in Fig. 9;

Fig. 11 is an oscillator arrangement according to the invention;

Fig. 12 illustrates a wireless receiver arrangement;

Fig. 13 a multiple wireless receiver, and

Fig. 14 a transmitter arrangement according to the invention.

Referring to the arrangement shown in Fig. 1, a triode 1 has its anode 2 connected through a retroactive coil 3, and output coil 4, and an anode battery 5 to one end of an impedance 6, the two ends of which are connected to terminals 7, to which is applied a local oscillation having a frequency equal to that of the oscillation which is to be amplified. The anode-filament circuit is completed through a contact 8 connected to filament 9 which has a heating battery 10. The grid 11 is connected through coil 12, an input device (not shown) connected to terminals 13, and biasing battery 14, to the end of the impedance 6 opposite to that connected to the anode. The position of the contact 8 along the impedance 6 is so selected that, when no signal is applied to the terminals 13, the voltage of the local oscillation applied to the grid 11 is reversed relatively to that applied to the anode 2 and of such a value that it prevents the flow of local oscillatory current through the anode circuit.

As, in this case, no local oscillatory current passes through the valve, the coil 3 has no retroactive effect on the grid circuit, and consequently the coil 4 which in practice will be coupled to some succeeding circuit will also be inactive. If, now, there is applied to the terminals 13 an oscillation to be amplified which has a frequency equal to that of the local oscillation applied at the terminals 7 of the impedance 6 and if the phase displacement of the former oscillation with respect to the local oscillation in the grid circuit is 180°, the resultant oscillatory voltage applied to the grid 11 is reduced, thereby allowing oscillatory current from the local source to pass through coils 4 and 3 and the valve 1. Means whereby the correct phase relation between the local oscillations and the oscillations to be amplified may be maintained will be described later in connection with Fig. 11. Coil 3 will now affect coil 12, producing a further reduction in the oscillatory voltage applied to the grid 11, thereby increasing the flow of oscillatory current in the anode circuit, which again reduces the oscillatory voltage of the grid 11, and so on, until a stable value is attained, assuming that the adjustments are satisfactory.

Within the stable range, amplification may be very great as there is no fear of the valve breaking into self-oscillation, as the grid and anode circuits are made substantially non-oscillatory or aperiodic. This may be done by so choosing the values of the resistances (R) of the circuits relatively to the inductances (L) and capacities (C) of those circuits, that even if those circuits are tuned to the local oscillation, free oscillations cannot occur, i. e. R is usually made not less than $$2\sqrt{\frac{L}{C}}.$$

Alternatively the circuits may be substantially free from resonant frequencies in the range to be received and the damping is even in this case preferably made relatively high. In both cases it may be said that the circuits are in effect aperiodic. Instability, or rather imperfect action, commences when the valve begins to rectify the local oscillations. The amount of amplification is dependent on the amount of retroaction. For instance, if the voltage of the oscillation which is being amplified, which will for convenience be referred to as the received voltage, produces a voltage in the grid circuit equal to 1, and if the retroaction is such that .5 volt is added thereto on the grid in one cycle of retroaction, the ultimate voltage of the signal in the grid circuit will be the sum of the series $1+.5+.25+.125+ - - - + - - -$ and so on, which for practical purposes is 2, i. e. the amplification is twice that of the valve itself. Similarly if the retroactive voltage is .9 of the grid voltage, the amplification is $10r$, if .99 then $100r$, and if .999 it is $1000r$, where $r$ is the amplification ratio of the valve itself. The retroactive voltage must of course always be less than the grid voltage to which it is due.

As the amplitude of the received voltage, together with the reactive augmentation, is increased, so the resultant oscillatory voltage in the grid circuit decreases until it becomes zero. After this point is reached, any further increase in the received voltage clearly produces a resultant voltage opposite in phase to that of the local oscillations impressed on the grid circuit. In the anode circuit there is no reversal of phase since the current therein increases progressively from zero to the maximum which the valve is capable of passing as the received voltage is increased. The arrangement is clearly stable due to the fact that the oscillatory voltage applied to the grid from the local source constantly tends to bring the valve back to the point where no oscillatory current is flowing in the anode circuit. The degree of coupling between the coils 3 and 12 may of course be made adjustable.

Referring to Figs. 2, 2a and 2b, 15 is the characteristic curve of the valve, the latter being adjusted so that the direct current in the anode circuit has the mean value indicated by the dotted line 16, zero anode current being represented by the line 17. When no oscillation is being amplified, the anode current is represented by 16, i. e. no oscillatory current is flowing through the circuit. When an oscillation is being amplified there is an oscillatory current as well as the direct current, the resultant current being as shown by the curve 18. As the power of the valve in terms of oscillatory energy is limited, and distortion of the oscillation is possible if the energy is too great, it is necessary that the anode current shall vary only between the limits indicated by lines 19 and 20, i. e. only along the straight portion of the curve 15. Should the oscillatory anode current exceed these limits, then distortion will occur as shown by the curve 18a, which varies between the limits 19a and 20a so that the portions 21 show some rectification of the oscillatory current. From this it is evident that the curve 18 (Fig. 2a) shows the maximum permissible oscillatory current in the anode circuit.

It is to be understood that the battery 5 in Fig. 1 does not supply energy for the amplifying action, but is only a source of uni-directional polarizing energy which is necessary because the valve 1 is a uni-directional device. In the present invention the energy for amplification is oscillatory, so that the device requires for its operation oscillatory "polarizing" energy which is applied to it at the terminals 7.

The uni-directional polarizing energy may be dispensed with if a non uni-directional device is used, as shown in Fig. 3, in which two triodes 1, 1a are used, the same reference numerals as in Fig. 1 being used for the triode 1 and parts associated therewith, whilst the parts associated with the triode 1a have been indicated by corresponding numerals with the index a, the input being shown at 13 and the output being taken from the terminals 4b.

Two or more amplifying stages according to Fig. 1 may be arranged in cascade as shown in Fig. 4, the general arrangement being known except for the application of the oscillatory polarizing energy. In Fig. 4 the triodes 1, 1a and 1b are arranged as cascade amplifiers, all of them being supplied with uni-directional polarizing energy from the battery 5, and uni-directional biasing from the battery 14. Oscillatory "polarizing" energy is also supplied to their anode circuits from 7, their grid circuits being likewise supplied with oscillatory "bias" from the same source. 13 is the input and 4b the output. If the retroaction from the anode circuit to the grid circuit of each triode is made .99 (i. e. retroactive amplification of 100 to 1) and the amplification ratio of each triode is 4 to 1, then the whole arrangement will give a total amplification of $(100 \times 4)^3$ to 1, i. e. a maximum of 64,000,000 to 1, without the slightest possibility of self-oscillation, or erratic behavior due to stray capacities, interelectrode coupling and the like, since the maximum oscillatory potential in any circuit is that which is applied at 7, there is no tuned circuit nor the slightest resonance anywhere, and the losses, so far as the oscillations to be amplified are concerned, are not substantial. Preferably the power capacity of the source of oscillations applied at 7 is such that under all normal working conditions there is no appreciable drop of oscillatory potential at 7.

The advantages of the invention will be more readily appreciated by a comparison with known methods of amplifying oscillations. The triode with its uni-directional polarizing energy is quite satisfactory for amplifying changes of a direct current provided the frequency and the rate of change of those changes are not too great. When the frequency is high, however, the only satisfactory amplification hitherto known was to allow the uni-directional energy to operate through tuned circuits and the like in order to set up oscillations in those circuits. Unfortunately the building up and dying away of the oscillations in those circuits require an appreciable time, so that although such arrangements may be considered satisfactory for amplifying oscillations of unvarying strength or varying only at very low frequencies, they are by no means sufficiently satisfactory when the oscillations vary rapidly in intensity, such as in the case of wireless telephony. This defect is due not so much to the triode itself as to the circuits associated therewith.

Fig. 5 shows a normal arrangement of a triode used to amplify an oscillation, the grid circuit only being shown. To the grid 22 and filament 23 there is connected a tuned rejector circuit consisting of an inductance 27 and condenser 25, to which the aerial 26 and earth 24 are connected, as shown. The whole tuned circuit consists of the inductance 27 shunted by the capacity 25, the aerial-earth capacity, the grid-filament capacity and the grid-anode capacity in series with the complex arrangement of inductances and capacities in the anode-filament circuit. However, for the purpose of explanation only the inductance 27 and condenser 25 will be taken into consideration. Naturally, there are losses in the tuned circuit and if an oscillatory potential is applied to it and then withdrawn, the oscillatory energy in the circuit will die away according to a definite law determined by the logarithmic decrement of the circuit. In other words, in each cycle of oscillation a certain percentage of oscillatory energy is lost, and therefore in order to maintain the oscillatory energy in the circuit at a constant value, the loss must be made good by some external supply. In Fig. 5 this external supply is obtained from the received signal and in the case of wireless telephony as the loss in the circuit is constant, some constant portion of the received oscillatory energy must be used to make good that loss. A modulated oscillation can be considered as a resultant of a constant portion and a variable portion of oscillatory energy, and the whole of the constant portion is taken by the tuned circuit to maintain its oscillatory energy constant. From this it will be appreciated that if the circuit loses energy at the rate of 1% per cycle of the oscillation, then the amount of oscillatory energy in the tuned circuit when in operation must be 100 times as much as the mean oscillatory energy applied to it. The applied and sustained oscillatory energies can be measured and regarded as oscillatory potentials across the inductance 27. If the received oscillation is a modulated oscillation, it can be regarded as varying oscillatory potential applied to the tuned circuit which therefore tends to vary the amount of oscillatory energy in that circuit; this can only be accomplished by dissipating or absorbing oscillatory energy. Dissipation cannot occur at more than a fixed rate and conversely the rate of absorption cannot exceed the same value. Should the applied oscillatory voltage vary at a greater rate, the circuit will be unable to respond fast enough so that there will be a loss of signal strength. The rate at which ordinary tuned circuits can vary their sustained oscillatory energy is so low that they can only respond perfectly to changes of an oscillation which are due to the lowest modulation frequencies of small amplitudes, i. e. quite small rates of change.

In this invention the oscillation to be amplified, assuming that it is of the same frequency as the local oscillation, does not make good the losses, for losses are greatest in the grid circuit of Fig. 1 when that oscillation is at zero intensity and they are made good wholly from the local source, the losses being reduced with increasing strength of that oscillation, up to the point where the local oscillation and the oscillation to be amplified are of equal potential in the grid circuit. Up to this point all the losses are made good from the local source, and it is preferable that the oscillation to be amplified in the grid circuit should never attain a greater value than that referred to, for, if this value is exceeded, the oscillations to be amplified will partly make up for the losses (the bulk being made good from the local source, via retroaction) and the result will be non-rectilinear amplification. As far as the oscillation which is to be amplified is concerned the devices and circuits used in this invention are pure voltage operated devices and consequently large amplifications and great selectivity can be obtained. An oscillation having a frequency slightly different from that of the local oscillation produces a negligible effect, particularly with such arrangements as that shown in Fig. 3, because such an oscillation has itself to make good the losses in the circuits through which it passes. In order to obtain the best results the inductances and capacities in the circuits are preferably as small as possible.

Retroaction is not essential in Figs. 1, 3 and 4 although without it amplication is much smaller, nor need the retroactive coupling be inductive, as couplings in the form of resistances, or capacities or both, or couplings containing a combination of inductance, resistance and capacity may be used in a well-known manner.

The arrangements shown in Figs. 1, 3 and 4 may be adapted for wireless transmitters. For instance in Fig. 1 there may be connected to the terminals 13 an impedance adapted to be varied at speech frequencies, such as a condenser or resistance microphone, and an aerial system may be coupled or connected to the terminals of the coil 4, whereby a telephony transmitter is obtained. Alternatively, the terminals 13 may be connected together and the microphone may be connected across the whole or part of the impedance 6, between contact 8 and that end of the impedance 6 which is connected to the grid 11. In this case, it is preferable that a mean oscillatory current should be allowed to flow through the anode circuit by reducing the oscillatory "bias" on the grid 11. For high powers the coil 4 may be coupled to the grid circuit of a suitable transmitting valve or series of valves.

Where the amplifying arrangements shown in Figs. 1, 3 and 4 are used for wireless reception, the output may be coupled to a detector valve adapted to rectify the modulated oscillations and this may be followed by suitable low frequency amplifying means in a known manner. The amplification which is possible with the arrangements according to this invention may however be further made use of for the purpose of eliminating the whole or part of the low frequency amplification, by the use of special detector arrangements.

Such an arrangement is shown in Fig. 6, in which 28 is the rectifier valve having its grid 29 connected to the filament 34 through an input device 30, which couples it to the output of an amplifying stage such as shown in Fig. 1, 31 a biasing battery and 32 an impedance to the ends of which the local oscillation is applied from a source connected to the terminals 33. Use is made of anode bend rectification, the battery 31 applying a negative potential to the grid 29 so that the anode current is about the level 39 of the characteristic curve 38 shown in Fig. 7. In Figs. 7, 7a and 7b the line 40 represents zero anode current. When the local oscillation is applied to the grid 29 of the valve 28 in Fig. 6, and the direct component of the voltage on the grid is at the level 39 in Fig. 7, the valve rectifies the local oscillation, which is shown by the curve 41 in Fig. 7a and the resulting anode current is that shown by the half cycles 42; 43 are the suppressed half cycles.

In modern valves the characteristic curve of anode current shows that the current may reach high instantaneous values as shown by the dotted portion of the curve 38 in Fig. 7, but the maximum energy dissipation is limited so that an unvarying anode current must not exceed a certain value, as shown by the line 44, and therefore the strength of the local oscillation applied is such that the average anode current does not exceed the level 44.

When an oscillation is applied to the grid circuit of the valve in Fig. 6 through the input device 30, it has a frequency equal to that of the local oscillation and its phase displacement relative to the latter is 180°. The said oscillation tends to reduce the strength of the local oscillation applied to the grid and therefore it reduces the average anode current. In the reception of wireless telephony the amplification in the amplifier stage is adjusted, so that for the unmodulated carrier oscillation the average anode current is at the level 45 corresponding to the centre of the useful straight portion of the characteristic curve 38 in Fig. 7. If now the received carrier oscillation is modulated, the average anode current will vary with the modulation, as shown by the curve 46 in Fig. 7b, which represents a low frequency, i. e. speech frequency in wireless telephony. When the curve 46 varies between the levels 39 and 44 of the anode current, the received carrier oscillation must be 100% modulated and therefore the received signal cannot exceed the amplitude of 46; further, as curve 46 represents a telephone frequency, the valve must be fully loaded at that frequency and further power cannot be obtained without distortion. From this it will be seen that low frequency amplification is not required, as the valve 28 in Fig. 6 may be of any desired power.

The local oscillation may be applied to the anode circuit with or without the battery 37, in which case the battery 31 may be reduced or dispensed with, but in this case the total energy for actuating the valve anode circuit is supplied by the local oscillation, which is not always desirable.

The arrangement of Fig. 6 gives half wave rectification of the oscillation but full wave rectification can be obtained by a modified arrangement, such as shown in Fig. 8, the low frequency output in both arrangements being from the terminals 36.

Use may be made of retroaction between the anode and grid circuits of the detector, although this is usually neither advisable nor necessary considering the high degree of amplification obtainable in the amplifier stages, which can be varied between very wide limits by a simple adjustment of the retroaction in one or more of the stages.

An amplifier stage coupled to a detector stage such as shown in Figs. 1 and 6 respectively, is illustrated in Fig. 9, which shows a most useful arrangement for amplifying any electrical currents provided the frequency of the local oscillation is sufficiently greater than the frequency of the changes of such currents. It may therefore be used for amplifying direct currents, alternating currents, telephone currents and the like. The invention accordingly offers great advantages in applications such as measuring devices, talking film recording and reproduction, gramophone recording and reproduction, public address systems and the like, since the amplification does not introduce so much distortion as is encountered in present-day methods and the degree of amplification obtainable is very high, even with only one stage of amplification.

In the arrangement illustrated in Fig. 9, the local oscillation is supplied to the terminals 48 and through the transformer 47 to the circuits of the valves 1 and 28. The currents to be amplified may be applied to the terminals 13 in any desired way but in all cases they should be in the form of a modulation of oscillation of the same frequency as the local oscillation. The most convenient method is to modulate the local oscillation either in a separate circuit connected to the terminals 13 or by varying an impedance connected to the said terminals. For instance the methods above described in connection with wireless telephone transmitters according to the invention may be used in such cases as sound recording and public address systems, one type of which is shown in Fig. 9, as the condenser microphone 49. In gramophone reproduction 49 may be a pick-up of the condenser type, the moving plate of which is vibrated by a needle traversing the groove of the record. In talking films sound reproduction may be accomplished if 49 is a selenium or photo-electric cell or other device electrically sensitive to light. Many other suitable methods and devices known in the art may be used for the same purposes.

Fig. 10 shows a method which is generally applicable to all amplifying purposes. In Fig. 10, 50 is a modulating valve the currents to be amplified being applied to the grid circuit at the terminals 51; 52 is a bias battery; the anode circuit contains the impedance 53, battery 54 and the output device 55 all in series with one another. The local oscillation is applied across the impedance 53 at the terminals 56, and the output device 55 is connected to the terminals 13 of Fig. 9.

When the invention is used in wireless reception it is necessary to ensure that the phase relation and frequency of the received oscillation with respect to the local oscillation shall be maintained constant in order to obtain the correct action as described in connection with Fig. 1. As is well known, the frequency of a received oscillation may vary in practice, and its phase may be different from that of a local oscillation of the same frequency. It is impossible to control the frequency or phase variations of the received oscillation at the receiver, but it is possible to control the frequency and phase of the local oscillation, and in order to maintain a fixed relation between the received and local oscillation, means are necessary whereby the former shall control the latter. Generally this can most readily be achieved by a control of the source of local oscillation, the most convenient form of which is one of the well-known arrangements of oscillating triode.

Such an arrangement is illustrated in Fig. 11, in which 56 is the triode, the anode circuit having the coil 57 coupled to the coil 58 of a tuned circuit which also contains a variable condenser 59 and a coil 60, the latter being coupled to the coil 61 of the grid circuit. The grid circuit also contains a small coil 62 and a biasing battery 63, while the anode circuit also contains a battery 64, which is shunted by a condenser 65. The coil 62 is coupled with the coil 66 which carries the oscillation received from a distant wireless station. If the circuit 58, 59, 60 is tuned closely to the frequency of the oscillation received in the coil 66 and the valve has correct adjustments of potential, oscillations will be generated which may be used for the purpose of this invention by connecting the terminals 67 to the arrangements previously described, for instance to terminals 7 in Fig. 1. The natural frequency of the oscillation generator may not be exactly the same as the frequency received, but provided the difference of frequency is very small and the characteristics of the circuits are suitably chosen, the received oscillations will pull the local oscillations into the same frequency as is well known in the art. Similarly the received oscillations will pull the generated oscillations into phase so that in the grid circuit the generated oscillations will have the same frequency as, and the opposite phase to, the received oscillation. Should the latter vary, the generated oscillation will follow the variation, and with suitable constants of the circuits, the lag may be so small as to be of no practical importance.

The invention may be applied in many other ways, it being possible to obtain various arrangements of oscillators, amplifiers, detectors and modulators by combining them together for specific purposes and using known principles and practice. For amplification purposes and for wireless reception generally one oscillator, one detector and one or more amplifiers will be required for every transmission received, or single series of electrical currents to be amplified. Owing to the extreme selectivity that can be obtained by the use of the invention, more than one wireless transmission and/or series of amplifying currents may be simultaneously handled by the apparatus. However, in this case one detector will be required for every amplification or reception and one modulating arrangement for every amplification of currents not in the form of modulations of an oscillation at a frequency present as a local frequency in the apparatus and for every transmission. Further, the oscillator must supply more than one oscillation or more than one oscillator must be used so that there is an independent oscillation at an individual frequency for each reception, amplification or transmission, but only one amplifier or cascade arrangement of amplifiers need be used.

Fig. 12 shows a complete wireless receiver arrangement according to the invention intended for the reception of one transmission. $a$ is the oscillator, $b$ the amplifier and $c$ the detector. $d$ is the means of tuning the local oscillation to the same frequency as that received and the circuit containing it is the only resonant circuit in the whole arrangement. Coil $e$ carries the received oscillation and a small portion of $e$ is included in the grid circuit of the valve $a$ for the purpose of ensuring correct phase and frequency relation between the received and local oscillations as described in connection with Fig. 11. When the valve $a$ is oscillating there is an oscillatory potential across the impedance $j$ which is applied to the anode of the valve $b$. At the same time by means of the coupled coils $g$ a suitable oscillatory potential is applied to the grid of the valve $b$ to prevent the flow of oscillatory current from the anode to the filament of the valve $b$, as described in connection with Fig. 1. The detector $c$ has also an oscillatory potential applied to its grid as described in connection with Fig. 6. Part of the coil $e$ is included in the grid circuit of $b$ and the phase of the received oscillation is displaced through 180° relatively to the local oscillation in that circuit. The received oscillation reduces the oscillatory potential on the grid of $b$, thereby allowing oscillatory current to pass through $b$ and thus reducing the oscillatory potential across $j$ and on the grid of $c$. Retroaction by the coils $h$ increases this potential to some stable value. The oscillatory potential on the grid of $c$ is proportional to the strength of the received signal, and therefore the anode current of the valve $c$ varies according to the modulation of the received oscillation. As this modulation is of low frequency, such as a telephone current, a sound reproducing device or the like may be connected to the terminals $k$. The degree of amplification may be controlled by the adjustment of the coils $h$. At the greatest strength of modulation of the received oscillation there will be no oscillatory potential across $j$, the whole local oscillatory energy circulating through the valves $a$ and $b$ and the latter acting in a negative manner with respect to the former.

The valves $a$ and $b$ are chosen so as to have suitable powers relatively to each other. Increased power from the arrangement can be obtained with a suitable adjustment of the oscillatory potential supplied by $g$ to the grid of $b$. In this case when no oscillation is being received, the valve $b$ operates in parallel with the valve $a$ to produce the oscillatory potential across $j$.

When an oscillation is being received, $h$ and $g$ are so adjusted that for the unmodulated received oscillation no oscillatory current passes through $b$, and the anode current of $c$ is at a mean value. When the received oscillation is increased by modulation, the action is as above described, the anode current of $c$ being reduced, but when the received oscillation decreases, oscillatory current flows through $b$ in the same sense as through $a$, thereby increasing the oscillatory potential across $j$ and the anode current of $c$. In this way modulation of the received oscillation produces alternate reversals of oscillatory current through $b$. The use of this arrangement for the reception of wireless transmission, i. e. modulated continuous waves, is very simple; by means of $d$ the apparatus is tuned to the carrier wave, the coupling of $g$ is adjusted so that the anode current of $c$ is at a mean value, and $h$ is adjusted until $c$ is fully loaded at low frequency without distortion.

Fig. 13 shows an arrangement of multiple, more particularly double, simultaneous reception. A and B are the means of tuning the local oscillator C to the frequencies of the two different oscillations to be received. D is the amplifier and E and F are the two detectors, one for each oscillation received. The anode oscillations of E react negatively on the grid circuit of F so that the oscillation handled by E shall not be active in F. Similarly F reacts on the grid circuit of E for the purpose of ensuring that the oscillation handled by F shall be ineffective in E. The outputs of the two signals are taken from the terminals G and H respectively.

Fig. 14 shows an arrangement for simultaneous double transmission. A and B are circuits tuned to different frequencies, the oscillations produced in them by the oscillator J being modulated by the microphones K and L respectively before they are applied to the grid circuit of the amplifier M, the two amplified modulated oscillations being led to the inductance N which is inserted in the aerial circuit. The condenser P is so adjusted that the natural frequency of the aerial system is approximately midway between the frequency of the two oscillations.

One of the carrier frequencies in this arrangement may for example be used for telephony and the other for the accompanying television signals.

Systems of multiplex two-way telephony, telegraphy or combined telephony and telegraphy may clearly be established with the aid of the present invention by the use of an appropriate number of suitable loading frequencies.

Although combined simultaneous transmitters and receivers may readily be designed, generally in view of the wide difference of power between a transmitter and a receiver, it is preferred that all transmitters be combined as one system, such as shown in Fig. 14 and all receivers be combined as a separate system, such as shown in Fig. 13.

In receivers according to this invention it is preferable, though not essential, that the local loading frequency shall be equal to the incoming carrier frequency, for a fixed local loading frequency may be used, and a second variable local frequency may be used to heterodyne the incoming carrier frequency to produce a modulated frequency equal to the loading frequency, in the manner known in supersonic receivers.

It is to be understood that the invention is not limited to the arrangements hereinbefore described and that they may be modified without in any way departing from the spirit of the invention.

I claim:

1. An electric circuit arrangement comprising two circuits having such damping that free oscillation thereof at a predetermined frequency is prevented, means for coupling said two circuits together, a source of electrical oscillations of the said frequency and means separate from said coupling for applying said oscillations to said circuits in such phase relation that the oscillations applied to one of said circuits are in phase opposition to the oscillations generated in this same circuit by the other said circuit due to said coupling.

2. Apparatus for the reception of modulated electrical carrier oscillations comprising two circuits having such damping that free oscillation thereof at the frequency of said carrier is prevented, means for coupling said two circuits together, a source of local electrical oscillations of said carrier frequency, means for applying oscillations from said source to said circuits in such phase relation that the oscillations applied to one of said circuits are in phase opposition to the oscillations generated in this same circuit by the other said circuit due to said coupling and means for positively maintaining a predetermined phase relation between said local and carrier oscillations even with small variations in the frequency of said carrier oscillations.

3. An amplifier for modulated electrical carrier oscillations comprising a thermionic valve having a grid circuit and an anode circuit, a local oscillation generator adapted to generate oscillations of a frequency equal to that of said carrier oscillations, means for applying local oscillations from said generator to said grid circuit and means for applying to said anode circuit, from said generator, local oscillations substantially equal in amplitude and opposite in phase to the oscillations generated in said anode circuit by the local oscillations applied to said grid circuit.

4. An amplifier according to claim 3, wherein said grid and anode circuits have such damping that free oscillation thereof at the frequency of said carrier oscillations is prevented.

5. An amplifier according to claim 3 wherein means are provided for applying the modulated carrier oscillations to said grid circuit.

6. An electric circuit arrangement comprising a first circuit and a second circuit each having such damping that free oscillation thereof at a predetermined carrier frequency is prevented, means for coupling said two circuits together, a generator of electrical oscillations of the said carrier frequency, a source of modulated oscillations of said carrier frequency, means for applying oscillations from said source to said first circuit, oscillation transmission channels for applying oscillations from said generator to both of said circuits and a coupling, separate from said oscillation transmission channel, and located between said source and said generator, for maintaining a predetermined phase relation between the oscillations generated by said generator and said carrier frequency oscillations.

7. An electric circuit arrangement comprising a thermionic valve having a grid circuit and an anode circuit, each having such damping that free oscillation thereof at a predetermined carrier frequency is prevented, a generator of electrical oscillations of said carrier frequency, a receiving circuit for receiving modulated oscillations of said carrier frequency, means for applying oscillations from said receiving circuit to said grid circuit, oscillation transmission channels for applying oscillations from said generator to said grid and anode circuits and a coupling, separate from said oscillation transmission channels and located between said receiving circuit and said generator, for maintaining a predetermined phase relation between the oscillations generated by said generator and said carrier frequency oscillations.

8. An electric circuit arrangement comprising a thermionic valve having a grid circuit and an anode circuit, each having such damping that free oscillation thereof at a predetermined carrier frequency is prevented, a generator of electrical oscillations of said carrier frequency, a receiving circuit for receiving modulated oscillations of said carrier frequency, means for applying oscillations from said receiving circuit to said grid circuit, an oscillation transmission channel for applying oscillations from said generator to said grid circuit, an oscillation transmission channel for applying from said generator to said anode circuit oscillations substantially equal in amplitude and opposite in phase to the oscillations generated in said anode circuit by the oscillations applied to said grid circuit from said generator and a coupling, separate from said oscillation transmission channels, and located between said source and said generator, for maintaining a predetermined phase relation between the oscillations generated by said generator and said carrier frequency oscillations.

9. An electric circuit arrangement comprising a thermionic valve having a grid circuit and an anode circuit, each having such damping that free oscillation thereof at a predetermined carrier frequency is prevented, a generator of electrical oscillations of said carrier frequency, a receiving circuit for receiving modulated oscillations of said carrier frequency, means for applying oscillations from said receiving circuit to said grid circuit, an oscillation transmission channel for applying oscillations from said generator to said grid circuit, an oscillation transmission channel for applying from said generator to said anode circuit oscillations substantially equal in amplitude and opposite in phase to the oscillations generated in said anode circuit by the oscillations applied to said grid circuit from said generator and a coupling, separate from said oscillation transmission channels, and located between said source and said generator, for maintaining the oscillations applied from said generator to said grid circuit substantially in phase opposition with respect to the carrier oscillations applied to said grid circuit from said receiving circuit.

10. A detector for modulated electrical carrier oscillations comprising a thermionic valve having a grid circuit, a receiving circuit for modulated carrier oscillations, a coupling for applying oscillations to be detected from said receiving circuit to said grid circuit, a local generator of electrical oscillations of carrier frequency, an oscillation transmission channel separate from said valve for applying oscillations from said generator to said grid circuit and a coupling, separate from said oscillation transmission channel, for maintaining a predetermined phase relation between the oscillations generated by said generator and said carrier frequency oscillations.

GEORGE WILLIAM WALTON.